United States Patent [19]
Edberg

[11] Patent Number: 5,740,082
[45] Date of Patent: Apr. 14, 1998

[54] COLLOCATED SENSOR ACTUATOR

[75] Inventor: Donald L. Edberg, Irvine, Calif.

[73] Assignee: McDonnell Douglas Corporation, Huntington Beach, Calif.

[21] Appl. No.: 576,232

[22] Filed: Dec. 21, 1995

[51] Int. Cl.⁶ .................................................. G01B 101/10
[52] U.S. Cl. ................ 364/559; 335/213; 250/363.03
[58] Field of Search ........................ 364/559; 310/90.5;
335/213, 219, 229, 183; 324/207.2, 207.24;
382/151; 250/363.03, 370.1, 201.8, 552

[56] References Cited

U.S. PATENT DOCUMENTS

| | | |
|---|---|---|
| 3,703,999 | 11/1972 | Forys et al. . |
| 3,860,300 | 1/1975 | Lyman .................... 310/90.5 |
| 3,937,148 | 2/1976 | Simpson .................. 104/283 |
| 4,033,541 | 7/1977 | Malueg . |
| 4,083,433 | 4/1978 | Geohegan, Jr. et al. . |
| 4,088,379 | 5/1978 | Perper .................... 310/90.5 |
| 4,443,743 | 4/1984 | Forys et al. . |
| 4,531,699 | 7/1985 | Pinson . |
| 4,643,385 | 2/1987 | Sandercock . |
| 4,724,923 | 2/1988 | Waterman . |
| 4,735,296 | 4/1988 | Pinson . |
| 4,833,351 | 5/1989 | Forys et al. . |
| 4,848,525 | 7/1989 | Jacot et al. . |
| 4,874,998 | 10/1989 | Hollis, Jr. . |
| 5,000,415 | 3/1991 | Sandercock . |
| 5,005,678 | 4/1991 | Julien et al. . |
| 5,052,529 | 10/1991 | Sutcliffe et al. . |
| 5,059,789 | 10/1991 | Salcudean . |
| 5,146,566 | 9/1992 | Hollis, Jr. et al. . |
| 5,206,504 | 4/1993 | Sridharan . |
| 5,231,336 | 7/1993 | van Namen . |
| 5,285,995 | 2/1994 | Gonzalez et al. . |

*Primary Examiner*—Emanuel T. Voeltz
*Assistant Examiner*—Thomas Peeso
*Attorney, Agent, or Firm*—Bell, Seltzer, Park & Gibson, P.A.

[57] ABSTRACT

A position sensor is structurally integrated within a wide-gap magnetic actuator. Being an integral structure, the sensor provides voltages representative of a relative shift in position of the actuator's armature and pole piece from the neutral or base position and represents the actual position between pole piece and armature. Suitably the position sensor includes a photosensitive surface in the shape of a circular disk that is attached to the actuator's paddle and a narrow beam light source which is attached to the actuator's pole piece and oriented to produce a small spot of light on the photosensitive surface.

14 Claims, 1 Drawing Sheet

U.S. Patent      Apr. 14, 1998      5,740,082
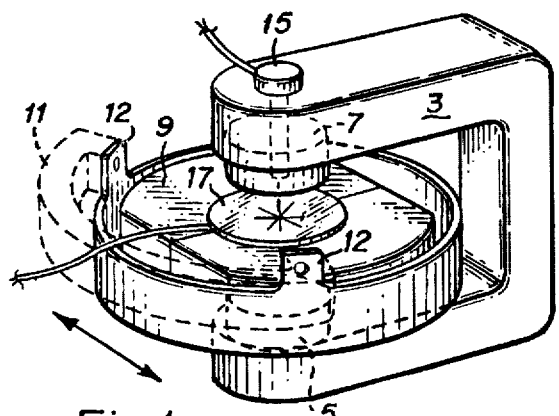
Fig_1
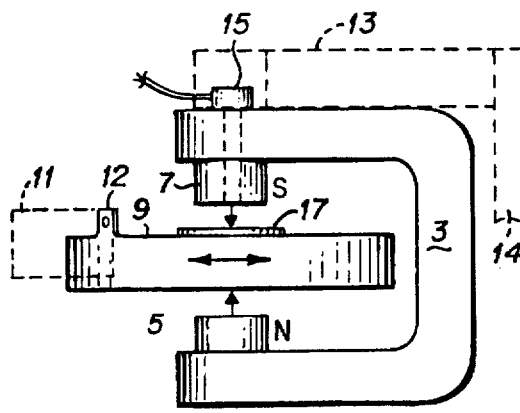
Fig_2
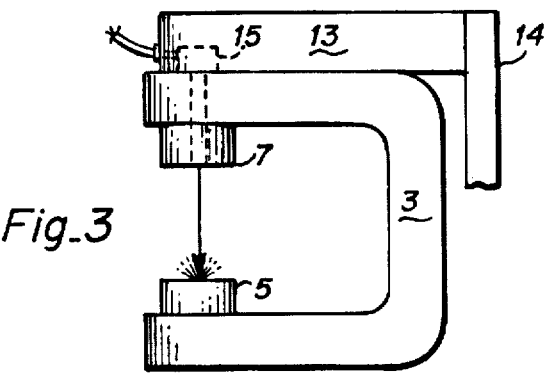
Fig_3
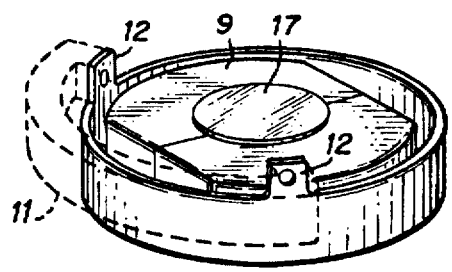
Fig_4
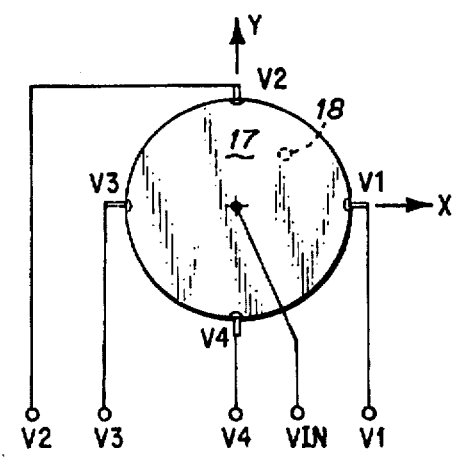
Fig_5
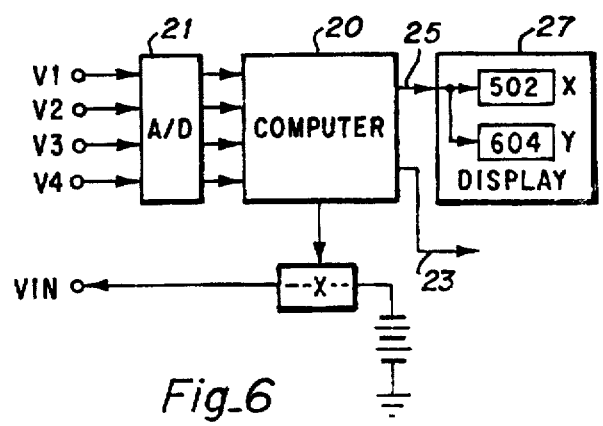
Fig_6

COLLOCATED SENSOR ACTUATOR

This application is related to application Ser. No. 08/496,192, filed Jun. 28, 1995, now U.S. Pat. No. 5,638,303 entitled NON-CONTACTING ISOLATED STABILIZED MICROGRAVITY PLATFORM SYSTEM, copending herewith, for which the benefit of 35 U.S.C. 120 is claimed.

FIELD OF THE INVENTION

This invention relates to a position sensor and magnetic actuator combination and, more particularly, to an integrated sensor and magnetic actuator assembly for a non-contacting isolated stabilized microgravity platform system.

BACKGROUND

A microgravity environment has long been recognized as an ideal environment to carry on certain types of experiments and manufacture, which, due to gravity, cannot be carried out on earth. As example, furnaces, crystal growth modules, biological experimental apparatus, combustion and mixing facilities, and materials science investigations, including but not limited to semiconductors, glass amorphous solids, high temperature alloys, ceramics, fluid and combustion physics; biotechnology, including protein crystal growth, separation of biological products, and controlled microgravity experiments, should all benefit in a microgravity environment. As a practical matter, such an environment is possible only aboard a space vehicle in orbit in outer space.

To successfully conduct such experiments and manufacture, the respective experiments or manufacturing apparatus are placed upon a microgravity platform that isolates the respective experiment or manufacturing apparatus over extended periods of time from shock and vibration as would jeopardize the result. If the sensitive equipment is momentarily accelerated, that acceleration simulates a gravitational effect, often one that is greater than $9.8 \times 10^{-6}$ meters (per second)$^2$.

In practical parlance in the space craft environment and as used herein, the term microgravity encompasses a more expanded definition. Such expanded definition allows for accelerations of microgee levels or below at frequencies of 0.1 Hz or less and increases from that level, linearly, to milligee levels at between 0.1 Hz and 100 Hz, the latter being the levels produced by the solar array motors and the like equipment, typically found aboard a space craft. While microgee and milligee forces greater than those levels are minute and trivial by standards on earth, should they occur during processes requiring microgravity environment, as heretofore defined, those forces are significant enough as compared to microgravity levels to jeopardize the results obtained from the experiment or manufacture.

In a prior application, the present applicant previously described a microgravity platform of the foregoing type, which is described in copending application Ser. No. 08/496,192 to Edberg et al, filed Jun. 28, 1995, in which applicant is a named co-inventor. That platform system contains a platform for seating microgravity sensitive apparatus in a floating relationship with a frame; a plurality of wide gap magnetic actuators and dual axis accelerometer combinations that are spaced about the platform and frame; position sensors for sensing position of the platform relative to the frame; and a control system for maintaining the platform in a predetermined position in spaced floating relationship with the frame. The control system includes an analog computer, responsive to the accelerometers, for neutralizing any acceleration forces applied to the platform; and a digital computer, responsive to the position sensors, for maintaining the platform in a predetermined position relative to said frame via the analog computer.

Each of the wide gap magnetic actuators is formed of a magnet assembly and a separate armature or paddle, as variously termed, which is movable relative to the magnet assembly. The magnet assembly is formed of a U-shaped magnetic frame, suitably iron or other high permeability material that provides a flux path, and magnets, located at the at end of each stem of the U, for creating a magnetic field that bridges the gap between the ends of the magnetic frame.

The magnet assemblies of the respective actuators are attached to respective locations on the platform, at spaced positions, and the associated paddles, are attached to corresponding locations on the frame. The paddle contains electrical coils. As initially assembled on the microgravity platform system, each paddle is located in alignment with the center of a corresponding one of the U-shaped magnetic frames in the wide gap at the end of the magnetic frame, with a straight portion of the coil immersed in the magnetic field in the gap between the magnets. Electrical current through the paddle coils produces magnetic fields that interact with the magnetic field produced by an associated magnet assembly to cause relative forces between the magnet assembly and the paddle, and, hence, between the platform and frame in the foregoing microgravity platform system.

Even though the platform essentially "floats" within the frame due to the weightlessness occuring in orbital spacecraft travel, as brought out in the prior application, some drift in platform position relative to the frame is possible; and must be corrected. Such drift is sensed by a plurality of included position sensors and the associated computer that monitors those sensors. And the platform is ultimately restored to a centered position by suitable energization of the wide gap magnetic actuators. Each of the foregoing position sensors is formed in two parts, one of which is mounted to the platform and the complementary part is mounted to the frame. And each of those position sensors is mounted to frame and platform locations spaced from the wide gap actuators.

Since it is the drift in position between the actuator's paddle and magnet assembly that is to be corrected through energization of the magnetic actuators, the position information obtained from the position sensors at one location must be translated to an equivalent drift in position at the location of the magnetic actuators. This requires accurate measurement of the spacing distance between each position indicator and the magnetic actuators and requires the use of various mathematical formulae, allowing the associated computer to determine the quasi-position information at the magnetic actuators. It is recognized that even accurate initial distance measurements can change with temperature change, due to thermal expansion or contraction of the platform and/or associated frame, and also through any flexure in the structure supporting the position sensor elements, such as the metal frame in the microgravity platform system.

In accordance with the prior invention, a platform system containing a platform and frame, is converted or transformed into a microgravity platform by the attachment of the wide gap magnetic actuators and the position sensors. Since the position sensors and the magnetic actuators in that system are separate and distinct component elements, sufficient space must be provided for each and sufficient time must be allowed to install and adjust each such component. It would be advantageous to reduce the volume occupied by such components and reduce the assembly time.

Accordingly, an object of the present invention is to provide an improved sensor assembly for a microgravity platform system and, thereby, an improved microgravity platform system.

Another object of the invention is to reduce the number of separate component parts required in the assembly of a microgravity platform system.

A further object of the invention is to prevent thermal and flexural effects affecting the frame of the microgravity platform system from affecting position sensor readings.

A still further object of the invention is to prevent thermal and flexural effects affecting the frame from resulting in inaccuracy of position sensor readings.

SUMMARY OF THE INVENTION

In accordance with the foregoing objects, the present invention integrates a position sensor on a wide gap magnetic actuator. Being an integral structure, the sensor provides voltages representative of a relative shift in position of the actuator's armature and magnet assembly from the neutral or base position and represents the actual relative position of the actuator's armature and magnet assembly. Suitably the position sensor includes a photosensitive surface, such as photoresistive, in the shape of a circular disk that is attached to the actuator's paddle and a narrow beam light source attached to the actuator's magnet assembly, with the light source oriented to produce a small spot of light on the photosensitive surface. With any relative movement between the paddle and armature, the spot of light is moved from the center of the disk to another off-center position, a distance proportional to the distance moved by the two actuator members. The new position of the light spot creates a measurable imbalance between output voltages obtained from spaced contacts on the photosensitive surface. The measured voltages are translated to position information.

In microgravity platform application, where any drift in position between the actuator's paddle and magnet assembly represents a corresponding change of the position of the platform within the frame, the relative displacement in position between paddle and magnet assembly is detected and corrected through appropriate energization of the magnetic actuator, which restores the position of the cited elements to the correct neutral position. Since the position sensor is formed integral with the actuator and is not mounted at a separate location spaced from the actuator, potential inaccuracy resulting from flexural effects of the intervening support structure, such as in the prior microgravity platform system, and/or thermal effects, is avoided. Further, since the separate elements are integrally formed, the number of components that must be assembled by the technician in the construction of a microgravity platform system is reduced.

The foregoing and additional objects and advantages of the invention together with the structure characteristic thereof, which was only briefly summarized in the foregoing passages, becomes more apparent to those skilled in the=art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 is an embodiment of the invention illustrated in perspective view, illustrating the paddle armature;

FIG. 2 illustrates the embodiment of FIG. 1 in side view;

FIG. 3 is top side perspective view of the magnet assembly and light source elements used in the embodiment of FIG. 1;

FIG. 4 is a top perspective view of the paddle and photosensitive disk elements used in the embodiment of FIG. 1;

FIG. 5 is a schematic diagram of the electrical circuitry of the photosensitive disk element of FIG. 1; and FIG. 6 is a block diagram of a computer system for determining position coordinates.

DETAILED DESCRIPTION OF THE PREFERRED EMBODIMENTS

Reference is made to the integral magnetic actuator and sensor combination illustrated in the perspective view of FIG. 1 and in side view in FIG. 2, which may be considered simultaneously, like elements being given like labels. The actuator is characterized by a U-shaped magnetic bracket or frame 3, as variously termed, suitably formed of iron, defining a relatively wide air gap between the stem ends or tip ends, as variously termed, of that U shaped member. Magnets 5 and 7 are located at each end of the U stem mounted to a side thereof. The magnets are oriented with the north pole of one magnet, 5, facing the south magnetic pole of the other magnet, 7, to produce a magnet field that spans the gap.

An armature or paddle 9 is positioned within the gap intersecting the magnetic field. The paddle is movable relative to the U shaped frame, both vertically and laterally. In application each of the paddle and frame may be attached to objects that are movable relative to one another. Either or both of the paddle 9 and frame 3 is movable. As is conventional, the paddle includes at least two electrical coils, not illustrated in detail, that are relatively flat in shape which are embedded or potted within an electrically non-conductive epoxy material of the paddle illustrated. A portion of the coil is located in the lines of magnetic flux created between the confronting magnets 5 and 7 and another portion of the coil is located outside the flux. Appropriate electrical leads from those coils, also not illustrated, extend to appropriate electronic sensing apparatus.

The foregoing wide gap type magnetic actuator is of conventional structure and for additional details the reader may refer to the technical literature for further details, to U.S. Pat. No. 4,443,743 to Forys et al and/or to the copending patent application Ser. No. 08/496,192, filed Jun. 28, 1995, now U.S. Pat. No. 5,638,303 which is incorporated herein by reference.

Further, since the purpose of a wide gap magnetic actuator is to control position of separate external structural members that are movable relative to one another for completeness of background, paddle 9 is shown supported by and affixed to a structural member 11, partially illustrated by dash lines by any conventional means, and U-shaped magnetic frame 3 is shown in FIG. 2 supported by and affixed to a support bracket 13 that in turn is connected to another structural member 14, also partially illustrated by dash lines. In the microgravity platform system of the cited copending application, the platform corresponds to element 11 in the figures and the frame associated with that platform corresponds to element 14.

Magnet 7 contains a cylindrical passage along the axis that opens to the front, which is a modification of the prior magnetic actuator structure. A light source 15 is mounted to the rear of magnet 7 with the light emitting end thereof mounted to the rear end of the passage.

The light source produces a narrow light beam which is aligned with the center of the opposed magnet 5. This alignment is better illustrated in FIG. 3 to which brief reference may be made. As also shown in FIG. 3, the U-shaped magnetic frame 3 is held by bracket 13 that holds the light source and the magnet bracket in proper alignment and provides a convenient means for mounting.

Suitably, light source 15 is a light emitting diode, such as a laser diode or other light or radiation emitting device that emits radiation in a narrow beam of light. That beam produces a small diameter circular spot on an incident surface. Although the light source is located within one of the magnets in the illustrated embodiment, alternatively, the light source may be located behind the permanent magnet parts or to the side of the permanent magnet parts. Further, the light emitter could be positioned at a more remote location on the assembly and routed to the appropriate location by means of fiber optic lines, mirrors or other means.

Returning to FIGS. 1 and 2, a photosensitive disk 17, which serves as the target for the light emitter, is attached to a face of paddle 9 facing the magnet 7 and located in the path of the light beam produced by light source 15. Disk 17 is better viewed in the top perspective view of FIG. 4 to which brief reference is made. The circular shaped wafer 17 is a thin self supporting structure. It may be attached to the armature with non-conductive adhesive. Collar 12 with the two upstanding prongs is a conventional means used to attach the paddle to structural member 11.

As illustrated in the schematic of FIG. 5, photosensitive disk 17 contains five electrical contacts, Vin and V1–V4, one located at the center and the other four located at the outer periphery evenly spaced from one another, by ninety degrees, about the disk's periphery and all equidistant from the disk center. Electrical contacts V1 and V3 are located along the x-axis of the disk and contacts V2 and V4 along the y-axis. These are the contacts for the input DC voltage, Vin, and the output voltages, viewed clockwise in the figure from V1 on the right, V2, V3 and V4. Electrical leads extend from those contacts for connection to electrical circuitry that monitors such voltages. Photosensors of the foregoing type are commercially available and are marketed as the model SC-50D by the UDT company of Hawthorne, Calif.

The spot of light incident on the disk is represented in the schematic, as example, by the circle formed of dots 18 in the upper right quadrant centered at location $X_N$, $Y_N$ as measured from the center of the disk, x=0, and y=0, using Cartesian coordinates. Upon assembly to a structure, the light generator is initially adjusted so that the light spot is located at the center of the disk.

In operation, should movement occur between the two structural members, hence, between the magnetic frame and armature connected respectively thereto, the spot of light is moved off that center and is positioned in one of the sectors of the circular disk, away from the center, such as given in the example, the exact position depending on the extent of relative movement. Being photoresistive material, the resistance of the photosensitive layer in the exposed portion that underlies the light spot becomes highly conductive, changing the surface resistivity of the disk.

With the light spot centrally located, and a voltage Vin applied to the center of the disk, the voltages at V1 through V4 are essentially equal, since the resistivity of all current paths between the center and the various contacts are symmetric about the disk's center, whereby the input current at Vin distributes equally amongst the four paths. When, however, relative movement occurs, the light spot is positioned in one of the quadrants, changing the location of the conductive portion of the photosensitive layer. Electrical current from Vin is no longer symmetrically distributed. As a consequence the relative levels of the voltages at outputs V1 through V4 changes.

That voltage distribution serves as a measure of the position of the light spot and the relative displacement of the actuator's paddle and the magnetic frame. Specifically, the position of the light spot is related to the measured voltages in accordance with the following equation:

X0=f1 (V1–V3, Vin); and

Y0=f2 (V2–V4, Vin), where f1 and f2 are calibration constants and are essentially equal in value and Vin is the input voltage. Given the measured values for V1–V4, the coordinates of the spot are easily obtained and indicated, as example, such as by the computerized system of FIG. 6 to which reference is made.

The sensor's output voltages V1 through V4 may conveniently be read and interpreted to determine coordinate displacement, suitably by a computer 20, as illustrated in the block diagram of FIG. 6. Thus each of the leads may be connected to an analog to digital converter 21. The outputs of such converters are input to the digital computer 20, wherein the computer determines the relative voltage of each. The computer makes the computation and then outputs a pair of voltages, as at output 23, and/or a digital code, as at output 25, that represents the position of the light spot. As desired the computer may also provide an output to a digital display 27 that produces a visual indication of the relative x and y coordinates of the spot.

For adequate resolution in a practical embodiment, the target, as example, is of 4.4 centimeters in diameter and the light spot is about 1.0 millimeters in diameter, occupying approximately 0.05% of the surface area of the disk.

Collocation of the sensors and actuators in an integral assembly as described in the foregoing specification simplifies design and improves the performance and versatility of the noncontacting isolated stabilized microgravity platform system described in the copending application of Edberg et al, U.S. Patent Ser. No. 08/496,192, filed Jun. 28, 1995. Being at the same location as the actuators, there is no need to adjust the readings taken by the sensors to account for displacement distance to the actuator, which thereby simplifies somewhat the electronics. Additionally, positioning inaccuracies brought about by slight inaccuracies in distances, such as the spacing distance between a separately located sensor to the associated actuators, as a result of temperature change or flexure of the platform material, are avoided. Volume, cost and assembly time in construction of the platform is reduced.

The non-contacting isolation platform, described in that previously filed application employs a minimum of three such position sensors. Three sets of mounting brackets and considerable wiring is eliminated. The installation and setup time is reduced. The optical target wiring may be combined with the actuator wires in alternative embodiments to simplify cabling requirements.

Although the magnetic actuator sensor combination has been described in connection with application to a microgravity platform system, it is appreciated that the combination may also serve to advantage in other applications containing two structural members that are movable relative to one another and that may be so moved by one or more wide gap magnetic actuators.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An actuator and position sensor combination comprising:

wide gap magnetic actuator means having a paddle and a magnetic frame, said paddle and magnetic frame being relatively moveable for coupling to respective structure members of a pair of relatively moveable structure members, said paddle and magnetic frame having a base position; and position determining means for representing the relative position of said paddle and said magnetic frame to said base position, said position determining means comprising photosensor means that is integral with at least one of said paddle and said magnetic frame, said position determining means further comprising light projecting means for projecting a beam of light toward said photosensor means, said light projecting means being integral with the other of said paddle and magnetic frame.

2. An actuator and position sensor combination comprising:

magnetic actuator means for coupling to a pair of relatively moveable structure members, said magnetic actuator means comprising:

a U-shaped magnetic frame and permanent magnet combination having spaced ends defining a wide magnetic gap between said spaced ends for creating a magnetic field across said spaced ends; and armature means;

said armature means comprising at least one electrical coil;

said armature means having a thickness that is less than said wide magnetic gap, wherein at least a portion of said armature means is capable of movement within said wide magnetic gap, transverse to said magnetic field, responsive to application of electric current to said coil, and lateral movement between said spaced ends, without physically contacting said respective magnetic frame and permanent magnet combination;

means coupling said magnetic frame and magnet combination to one of said relatively movable structural members;

means coupling said armature means to the other of said relatively movable structural members;

a photosensitive circular disk, said disk having a center and being of a predetermined diameter, said disk further comprising a surface of photoresistive material, whereby the electrical resistivity of said photoresistive material is changed during exposure to light;

a plurality of four electrical contact means, said electrical contact means being spaced from one another by 90 degrees about the periphery of said disk and each said electrical contact means being connected to a respective peripheral portion of said disk;

fifth contact means connected to said center of said disk;

means for connecting a source of voltage, Vin, to said fifth contact means, wherein a voltage is produced at each of said four contact means, V1, V2, V3 and V4;

light beam projecting means for producing a narrow beam of light, said light beam projecting means being aimed at said circular disk to produce an incident spot of light on a portion of said circular disk surface;

said photosensitive material producing a change in photoresistivity in the portion of said disk surface that underlies said incident light spot;

means for supporting said circular disk on one of said armature means and a magnetic frame and means for supporting said light beam projecting means on the other one of said armature means and said magnetic frame, whereby movement of said armature means relative to said magnetic frame in a direction transverse of said light beam produces a displacement of said incident light spot in disk surface position, from one location on said disk surface to another location thereon; and voltage monitoring means for monitoring said voltages produced at each of said respective peripheral contact means.

3. The invention as defined in claim 2, further comprising:

position determining means, responsive to said voltage monitoring means for producing a representation of the vertical and lateral displacement of said incident light spot from said center position.

4. The invention as defined in claim 2, wherein said light beam generating means comprises: a light emitting diode.

5. The invention as defined in claim 4, wherein said light emitting diode comprises: a laser diode.

6. The invention as defined in claim 2, wherein said light beam generating means includes: a light source, and fiber optic light transmission means, said fiber optic light transmission means having a first end coupled to said light source and a second end directed at said circular disk.

7. The invention as defined in claim 2, wherein said first, third and fifth contacts are located along a first axis, x, said first contact and said third contact being equidistant from said fifth contact, and wherein said second, fourth and fifth contacts are located along a second axis, y, orthogonal to said first axis, said second contact and said fourth contact being equidistant from said fifth contact, and wherein said first and second contact are equidistant from said fifth contact; wherein V1 is produced at said first contact, V3 is produced at said third contact, V2 is produced at said second contact and V4 is produced at said fourth contact in response to application of Vin at said fifth contact; and means responsive to said voltage monitoring means for determining the position X0, Y0, on said disk surface at which said light spot is incident in accordance with the relationship X0=f1(V1−V3) and Y0=f2(v2−V4), where f1 and f2 are constants and are essentially equal in value.

8. An apparatus for positioning a pair of relatively moveable structure members, the apparatus comprising:

a magnetic frame having spaced ends defining a magnetic gap therebetween, said magnetic frame operably connected to one of the structure members;

a paddle at least partially disposed within the magnetic gap defined by said magnetic frame to thereby define a base position, said paddle operably connected to another of the structure members;

a light source, associated with one of said magnetic frame and said paddle, for emitting a beam of light toward the other of said magnetic frame and said paddle; and a photosensor, mounted upon the other of said magnetic frame and said paddle, for receiving the beam of light emitted by said light source and for producing at least one signal indicative of positional offset of said paddle from the base position.

9. An apparatus according to claim 8 wherein a magnetic field is created between the spaced ends of said magnetic frame, and wherein said paddle comprises at least one electrical coil disposed at least partially within the magnetic field created between the spaced ends of said magnetic frame.

10. An apparatus according to claims 8 wherein said light source is associated with said magnetic frame, and wherein said photosensor comprises a photosensitive disk carried by said paddle.

11. An apparatus according to claim 10 wherein said light source comprises:

a light emitting diode remote from the spaced ends of said magnetic frame; and an optical fiber extending between said light emitting diode and one of the spaced ends of said magnetic frame for delivering at least a portion of the light emitted by said light emitting diode to said photosensitive disk.

12. An apparatus according to claim 8 wherein said photosensor comprises a photosensitive disk, said photosensitive disk comprising:

a surface covered with a photoresistive material having an electrical resistivity which changes upon exposure to light; and a plurality of electrical contacts at respective, spaced apart locations upon said surface.

13. An apparatus according to claim 12 further comprising:

voltage supply means for applying a predetermined voltage to one of said plurality of electrical contacts; and voltage monitoring means for monitoring the respective voltage levels at the other of said plurality of electrical contacts.

14. An apparatus according to claim 13 further comprising position determining means, responsive to said voltage monitoring means, for determining the positional offset of said paddle from the base position.

* * * * *